United States Patent [19]

Wallqvist

[11] 4,250,748
[45] Feb. 17, 1981

[54] FUEL VOLUME METER

[75] Inventor: Sven Wallqvist, Halmstad, Sweden

[73] Assignee: Haldex AB, Halmstad, Sweden

[21] Appl. No.: 933,899

[22] Filed: Aug. 15, 1978

[30] Foreign Application Priority Data

Sep. 15, 1977 [SE] Sweden .................................. 7709364

[51] Int. Cl.³ .............................................. G01F 3/18
[52] U.S. Cl. .................................................... 73/247
[58] Field of Search .......................................... 73/247

[56] References Cited

U.S. PATENT DOCUMENTS

| 1,814,725 | 7/1931 | McGogy | 73/247 X |
| 1,911,521 | 5/1933 | Marsh | 73/247 |
| 1,985,399 | 12/1934 | Blum | 73/247 |
| 2,008,623 | 7/1935 | McGogy | 73/247 X |
| 2,055,710 | 9/1936 | Smith | 73/247 |
| 2,208,950 | 7/1940 | Risser, Jr. | 73/247 X |
| 2,746,430 | 5/1956 | Steen | 73/247 |
| 3,159,030 | 12/1964 | Maginnis | 73/247 |

FOREIGN PATENT DOCUMENTS

336920 7/1971 Sweden .
354370 3/1973 Sweden .

*Primary Examiner*—Herbert Goldstein
*Attorney, Agent, or Firm*—Sherman & Shalloway

[57] ABSTRACT

Two pairs of reciprocating pistons are selectively driven by a volume of fluid to be measured. The pairs are perpendicular to one another and connected to a crank for converting the reciprocating motion into rotary motion to magnetically drive a recording means. A valve is driven by the crank for selectively controlling the flow of the liquid into the piston bores. A conical member limits the stroke of one set of the pistons thereby adjusting the stroke of the meter. The member has a bimetal unit which automatically adjusts the stroke in response to the temperature of the liquid.

12 Claims, 34 Drawing Figures

FUEL VOLUME METER

BACKGROUND OF THE INVENTION

1. Field of the Invention

This invention relates to a fuel volume meter comprising a housing, through which fuel to be measured is flowed and includes an inner chamber with a fuel inlet and a fuel outlet, and a drive means for driving the input of a printing and/or recording member in response to the fuel volume flowing through the meter housing.

2. Description of the Prior Art

Fuel volume meters are used in the fuel feed system for different types of vehicle engines. Such meters are utilized typically in such cases when the fuel consumption is taxed and, further, when the condition of the engine is to be judged on the basis of its fuel consumption per distance run or per running time and when it is to be determined whether the engine requires a checkup. Such meters are previously known, at which the fuel quantity can be read directly, for example according to U.S. Pat. No. 3,805,602. Various methods of coupling a fuel meter into typically the fuel injection system of diesel engines are described in U.S. Pat. Nos. 3,750,463, 3,949,602, 3,817,273 and 3,672,394.

In the firstmentioned U.S. Pat. No. 3,805,602 a meter is described which accurately measures the volume or weight of the fuel consumed per time unit by an engine. The meter comprises a piston, which is driven reciprocally by the fuel pumped by an engine fuel pump through the meter. Said reciprocatory movement is transformed into a rotary movement by a cylinder cam, the output of which drives a tachometer or the like, which is calibrated to indicate the fuel volume or weight consumed per time unit.

The mechanism of said meter for transforming the reciprocatory movement of the piston into a rotary movement, and the valve mechanism of the meter connecting the fuel inlet and outlet to the cylinder space of the piston in order to cause the piston to reciprocate, are very complicated from a mechanic aspect and include many fault-sensitive details.

SUMMARY OF THE INVENTION

A main object of the present invention is to produce a meter of the afore-described kind, which is less complicated and more reliable in operation compared with the known art.

The invention, thus, has the object of producing a fuel volume meter of both recording and indicating type with a very high accuracy in measuring the volume within a large flow range, for example between 0.1 and 100 liters/hour. The meter shall have a rotary output capable of being mechanically loaded and able to directly drive readable or printing counting mechanisms. The meter shall not require especially narrow manufacturing tolerances, but permit calibration in a simple way, for example by means of a screw-driver. In view of the fact that gasoline and other fuels expand by about 1.1% per 10° C., the meter shall provide possibilities for temperature compensation. The meter, furthermore, shall be applicable, without re-adjustment, to different types of fuels, for example (non-lubricating) gasoline, diesel oil, engine kerosene and other fuels in use or imagined to be used. When being combined with known odometers, the possibility should exist of printing both the distance run and the fuel volume consumed. The meter, further, shall be resistant to cold and heat, have a long service life and cause lowest possible pressure drops in the measuring conduit. The meter, furthermore, shall be leak-proof without complicated sealing arrangements.

A fuel volume meter of the kind referred to above according to the invention is substantially characterized by four pistons provided in the housing and driven reciprocably by the fuel to be measured each in a cylinder bore, in which a cylinder chamber is defined between the respective piston and a cylinder head. The pistons rigidly are connected relative to each other in pairs by means of a common flat piston rod, and the two piston rods in a superimposed relationship to each other intersect one another at a right angle within the inner chamber of the housing, and each piston rod is provided with a central transverse long hole. A valve means is provided to successively connect the respective chamber with the fuel inlet and the respective opposed chamber with the fuel outlet. The crank of a crank mechanism is provided with two freely rotatable rollers of mutually superimposed relationship, each roller inserted in one of said long holes and capable to control the valve means and to transform the reciprocal movement of the two piston rods into a rotary movement of the output end of the crank mechanism.

In order to eliminate the necessity of a shaft extending through said housing and the shaft sealing problems involved therewith, according to the invention the output end of the crank mechanism located opposite to the crank advantageously is provided with a magnetic coupling, which magnetically transfers the rotary movement of said end to a corresponding magnetic coupling of the input of the printing and/or recording member.

The housing of the meter preferably comprises a planar valve surface and a circular valve plate with a sealing surface. The valve surface is provided with a central hole communicating with the outlet, four secondary holes arranged about the central hole and an additional hole extending outside the valve surface from the inlet to the inner chamber of the housing. The secondary holes are arranged at 90° intervals in a circle concentric with the outlet hole and each of the four secondary holes extends to one of the chambers. The circular valve plate has a lower circular central recess with a diameter exceeding the distance between the outlet hole and the secondary holes. The sealing surface on the valve plate is concentric with the recess, abutting the valve surface, in such a manner that the axis of the centre of rotation of the crank mechanism coincides with the centre of the outlet hole, and the crank thereof drives the valve plate in a circular movement about the centre. Thus, the recess connects the outlet hole and the inner chamber of the housing to the four holes. The four holes extend into the cylinder head chambers in such a way that of the two opposed cylinder head chambers associated with one piston pair, one chamber is connected to the inlet and the other chamber simultaneously is connected to the outlet.

In order to improve the sealing of the valve plate against the valve surface, preferably a compression spring is provided between the crank and the valve plate, in such a manner that the crank end passes through the spring and engages with a central blind bore in the plate. The aforesaid pistons can each be formed of a clamping plate provided on the piston rod and of a clamping disc attached on the side of the cylinder head, and a circular rubber membrane, which is clamped between the plate and said disc, and the edges of which are sealingly clamped about the cylinder bore between the outer wall of the housing and a circular cylinder head. The rubber membrane preferably is provided with holes inside of its circumferential edge to render communication possible between the respective cylinder bore chamber, which is defined by the cylinder head and the piston, and the associated one of the four holes in the valve means, and the membrane forms a fold of sufficient depth in the area between the clamping disc and the cylinder bore wall to permit the piston movements.

Preferably, for calibration purposes the piston rods include, in addition to the central transverse long hole, a longitudinal long hole between said transverse long hole and one piston rod end, an adjusting and calibrating member is screwed into the cover of the housing in such a position and with such a length, a free conical end portion of the member can be screwed down more or less into the longitudinal long hole of one piston rod for adjusting the stroke length of the pistons. For temperature compensation, furthermore, the conical end portion of the adjusting member preferably is screwed into the cover over two bows of bimetal, which are surrounded by the fuel in the meter housing to vary the penetration of the conical end portion into said longitudinal long hole as a function of the fuel temperature.

The calibrating member, alternatively, may be an adjusting screw, which is attached in at least one of the cylinder heads, and the free end of which is capable of abutting the respective piston so as to serve as an end stop in order to limit the stroke length of the piston.

In order to reduce the friction losses, the magnetic coupling preferably consists of a magnetic ring attached concentrically in a holder of, for example, plastic material, which is attached to the output end of the crank mechanism and on the central portion of its opposed side has a protrusion, which with low friction rests against the lower or inner side of a sealing disc constituting the uppermost portion of the housing, and the corresponding magnetic coupling of the printing and-/or recording member is formed with a corresponding protrusion resting against the upper or outer side of the disc directly in front of said firstmentioned protrusion.

The invention is described in greater detail in the following, with reference to the embodiments illustrated in the accompanying drawings.

DESCRIPTION OF PREFERRED EMBODIMENT

The fuel volume meter according to the invention comprises a volume meter portion in the form of a four-cylinder "radial engine arrangement" including a plane slide for flow directioning. The plane slide is spring- and pressure-loaded, in such a manner, that with increasing mechanical load on the output, the pressure difference between the inlet and the outlet increases and the plane slide, in a corresponding manner, is pressed against its opposite sealing surface.

Figure 1:
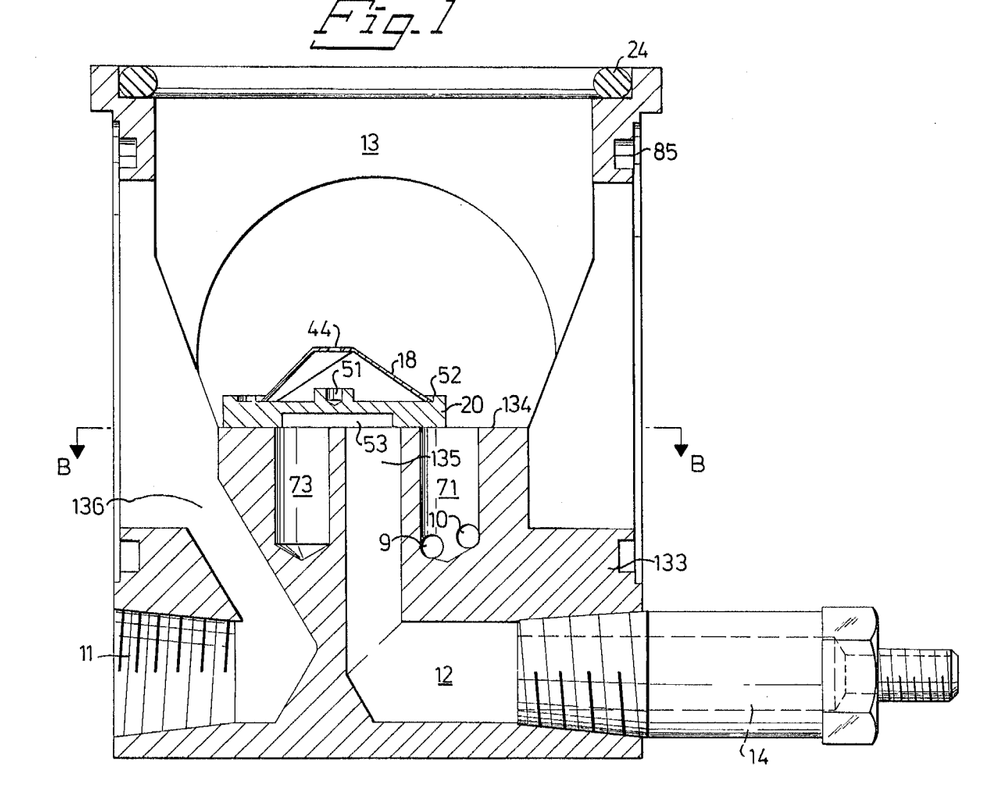
FIG. 1 shows a cross-sectional view of the fuel flow portion of the meter, more precisely the light metallic housing of the meter taken along section A—A in FIG. 2.
Figure 2:
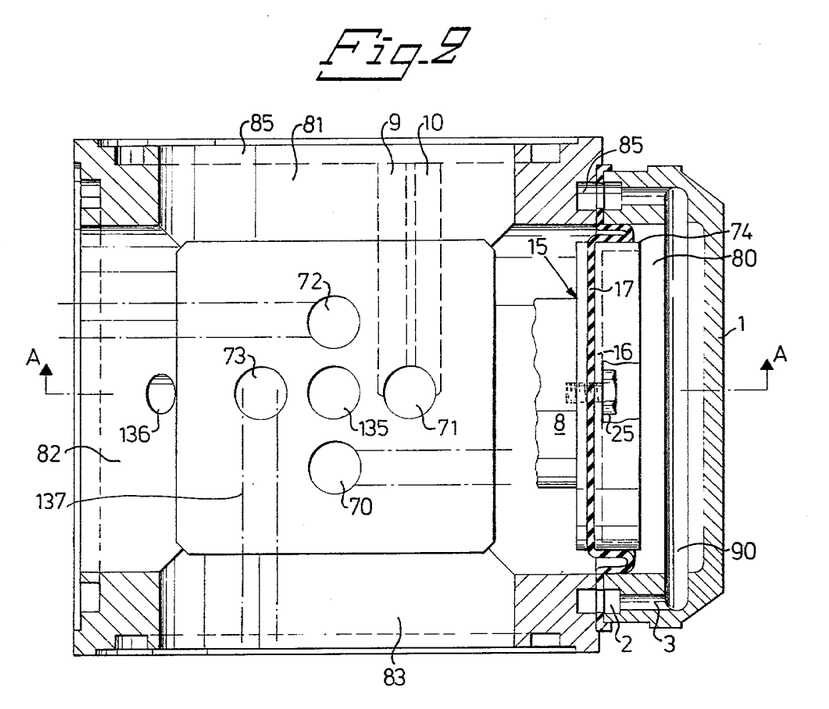
FIG. 2 is a cross-sectional view taken along section B—B in FIG. 1.

The fuel meter housing 13, which in FIG. 1 is shown by way of a central section along A—A in FIG. 2 and in FIG. 2 by way of a cross-section along B—B in FIG. 1, comprises four cylinder bores 80 and 82 and, respectively, 81 and 83 associated in pairs in opposing position. The housing is a cast piece with a square solid bottom 133 seen in FIG. 2 from above, the upper surface of which serves as a valve surface 134. In the bottom four bores 70-73 in opposing pairs, and one central bore 135 are provided. Central bore 135 is connected to a fuel outlet passageway 12. A bore 136 is provided to the left in the bottom of the left-hand cylinder bore 82 connected to a fuel inlet passageway 11, which in this way is connected to the interior of the housing 13. The bores 70-73 are separated by 90° divisions of a circle having its center in the center of the central outlet bore 135. Each bore 70-73 is connected through transverse bores 9, 10 in the bottom 133 to an annular passageway 85 about the respective cylinder bore, each transverse bore in one side wall of the housing. In this embodiment two transverse bores 9 and 10 are shown extending from the bore 71. The transverse bores extending from the remaining bores 70, 72 and 73 are indicated in FIG. 2 only by their dashed central lines 137.

In FIG. 1 a circular plane valve plate or disc 20 is shown to be slidable on the surface 134. On the plate a valve spring 18 with a central opening 44 is located. The function of the valve plate 20 in co-operation with the openings 135 and 70-73 will be described by reference to FIGS. 10, 11 and 19.

The fuel inlet 11 and the fuel outlet 12 each have a threaded connecting nipple 14, of which only the nipple for the outlet is shown in FIG. 2.

Of the remaining details shown in FIGS. 1 and 2, a cylinder head 1 with an annular groove 2 and a second annular groove 90 can be mentioned. Annular grooves 90 are connected relative to each other through four bores or holes 3. Between the cylinder head 1 and the opposed housing wall a rubber membrane 17 is clamped. Membrane 17 is attached to the end of a partially shown piston rod 8 due to being clamped between a clamping plate 15 attached to rod 8 and a clamping plate 16. The plate 15 and 16 are secured by a screw 25, and a peripheral edge 74 of which projects outward to the right in FIG. 2. It is understood that the remaining three cylinder bores upwardly, downwardly and to the left in FIG. 2 have corresponding arrangements (not shown) of piston rod, piston head and rubber membrane. Upwardly in FIG. 1 an O-ring 24 is shown to seal against a cover described below. The pistons here dealt with are membrane pistons in order to easily prevent leakage about the pistons. It is understood that the usual piston type with a suitable rubber lip sealing can also be used.

From FIG. 1, it is apparent how the membrane pistons operate. The cylinder head 1 abuts the membrane edge, which seals both inward and outward flow. Holes provided in the membrane edge (see FIG. 4) connect the annular groove 85 in the housing with the groove in the cylinder head and establish connection between the cylinder bore 80 and the hole 70. The membrane 17 forms a fold about the clamping disc 16 and is held in a bulging-out position by the fuel pressure in the interior of the housing 13. Upon the reciprocatory piston movement, the membrane 17 rolls against the inside of the cylinder head 1 and the outside of the clamping disc 16. Thus, there is no friction, but only the "kneading" action of the membrane rubber 17 about the clamping disc 16.

Figure 3:
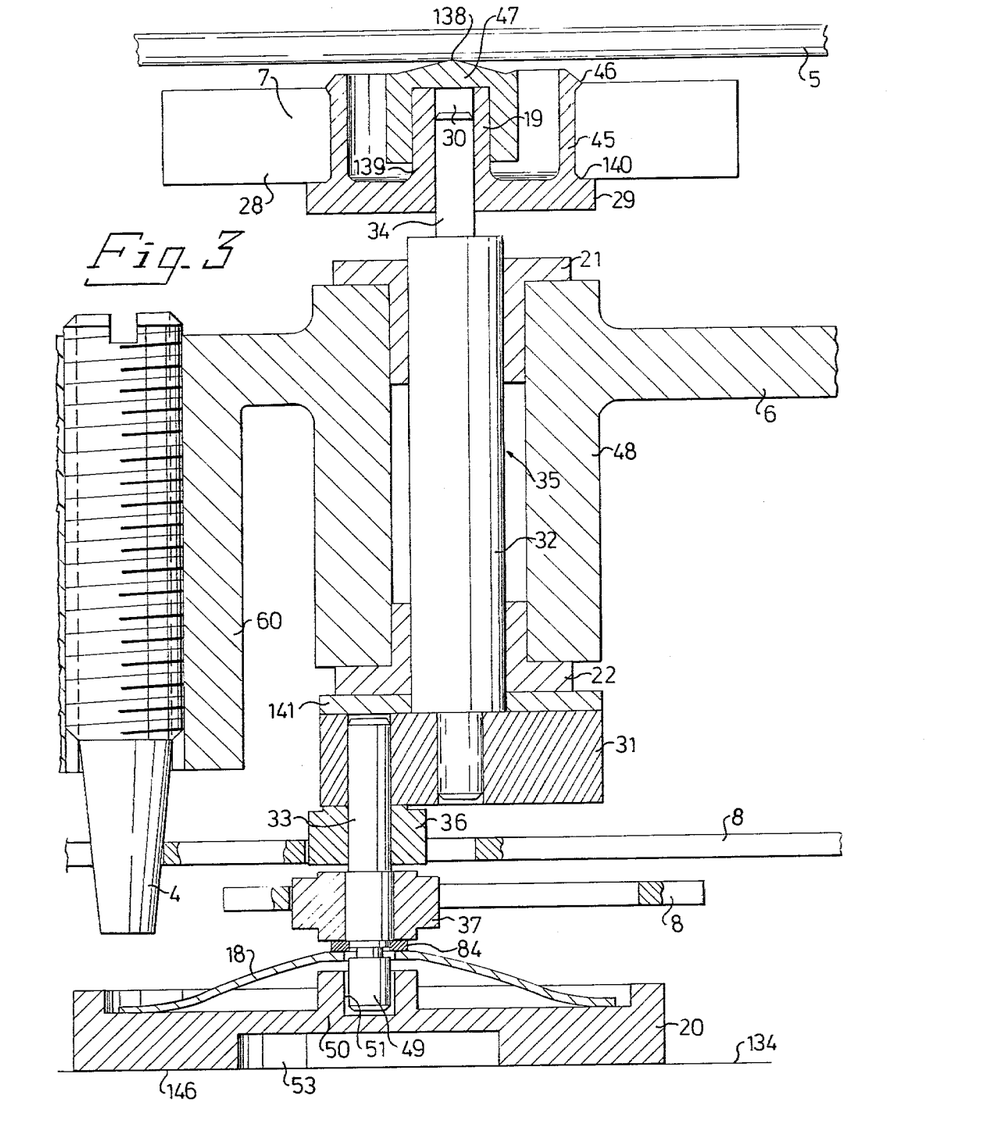
FIG. 3 shows the movement transferring components in the meter housing.

In FIG. 3, the parts of the movement transfer mechanism in the fuel meter according to the invention are shown. It shows, starting from above, a sealing disc 5 constituting the uppermost portion of the flow portion of the meter. Below disc 5 a magnetic coupling is shown, which generally is designated by 7 and comprises a central magnet holder 19 of, for example, nylon which holds a magnetic ring 28 of, for example, ferrite and rests with a protrusion 138 against the lower surface of the disc 5 for relative rotation and comprises a hub 47, into which is inserted a sleeve member 139 of a disc portion 29 provided with an upright circumferential wall 45. The magnetic ring 28 is clamped between an edge flange 46 on the upper end of the wall 45 and a stepped portion 140 on the disc portion 29. The wall 45 preferably is provided with height slots to facilitate the clamping of the magnetic ring 28. Into a central square blind bore 30 in the portion 29 is inserted the square pin 34 on the end of a crank unit generally designated by 35, the unit comprises a crankshaft 32, a crank disc 31 rigidly connected to the crankshaft and a crank 31 connected eccentrically and rigidly to the crank disc 31, which crank terminates in an end pin 49. A cover 6 shown in greater detail in FIG. 7 comprises a hub 48, in which the crankshaft 32 is rotatably supported by an upper bushing 21 and a lower bushing 22. A loose disc 141 is located between the bushing 22 and the crank disc 31. On the crank 33 an upper roller 36 and a lower roller 37 are supported which are inserted in holes in piston rods 8 in the manner described below. A spring catch 84 of normal U-shape holds the rollers on the crank 33. The end pin 49 is rotatable in a bore 51 in a hub 50 of the plane valve plate 20, which includes a central circular recess 53 and rests with its lower surface 146 against the previously mentioned sealing surface 134 on the bottom portion 133 of the housing 13. Into a second hub 60 or sleeve portion of the cover 6 an adjusting cone 4 can be threaded, the function of which is described below.

Figure 4:
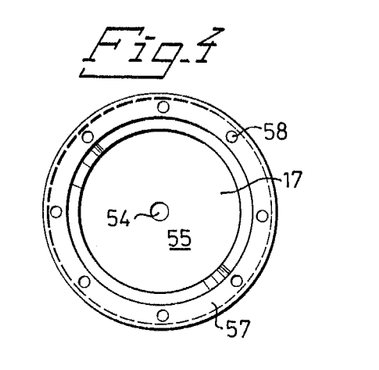
FIGS. 4-6 show a top view of a piston rubber membrane and FIG. 5 shows a detail of a cross-section of FIG. 6 of the membrane edge on an enlarged scale.
Figure 5:
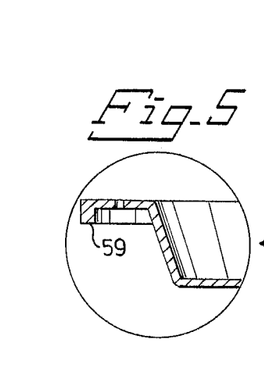
Figure 6:
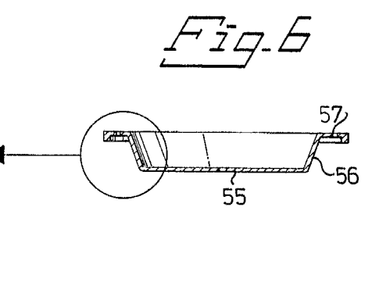

The rubber membrane 17 referred to in connection with FIGS. 1 and 2 is shown in greater detail in FIGS. 4-6. The membrane includes a central hole 54 for the passage of the screw 25 in FIG. 2, a bottom 55, an inclined membrane wall 56 and a peripheral edge 57. Edge 57 has an edge flange 59 and is provided with a plurality of holes 58.

Figure 7:
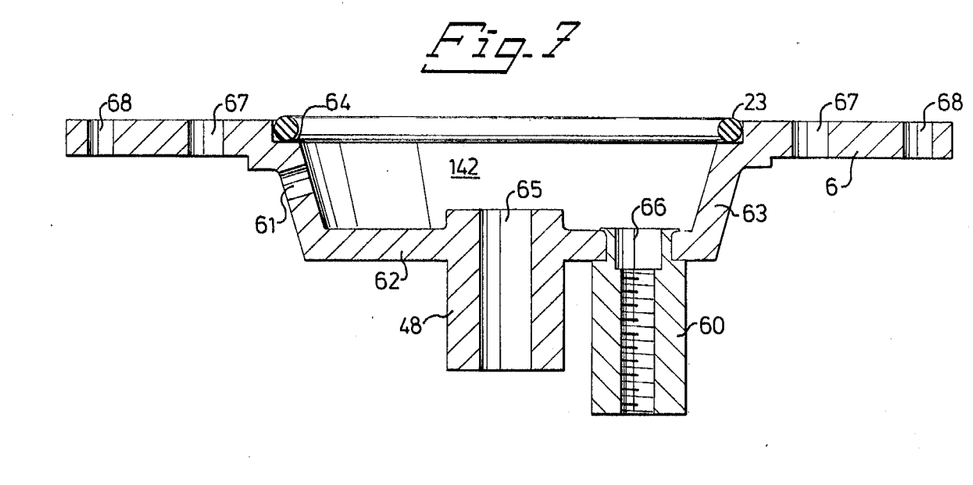
FIG. 7 is a cross-section of the meter housing cover.

The cover 6 shown by way of a cross-section in FIG. 7 includes holes 67 for attachment to the housing 13 and holes 68 for attaching the recording, indicating and/or printing member of the meter according to the invention, which member is described below. A depression 142 in the cover has an inclined wall 63, a bottom 62 with two through bores 61 (of which only one is shown) and the aforementioned hubs 48 and 60 with bores 65 and, respectively, 66. An O-ring 23 for sealing against the disc 5 (FIG. 3) is located on a shoulder 64 about the periphery of the depression 142.

Figure 12:
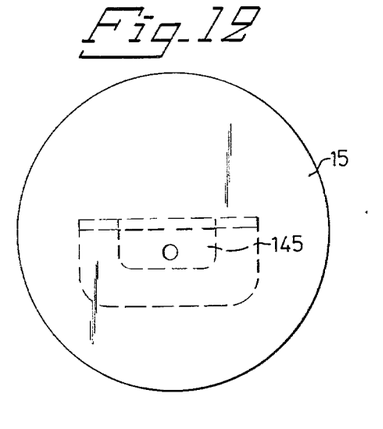
FIGS. 12-14 show a piston rod from the side, from above and, respectively, by way of a lateral section.
Figure 13:
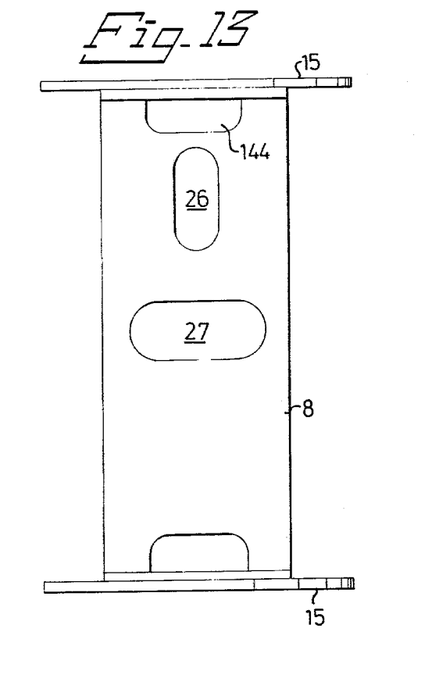
Figure 14:
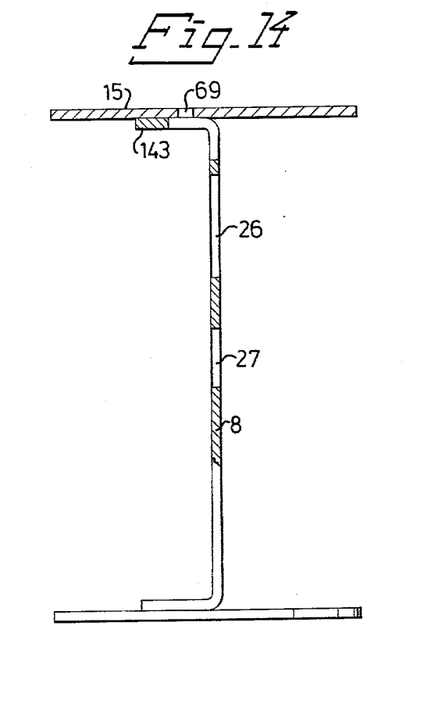

In FIGS. 12-14 one of the two mutually alike piston rods 8 in the fuel flow portion of the meter according to the invention is shown. A clamping plate 15 is attached to each end of the piston rod, for example by spot welding on a folded-up portion 143 at both ends of the rod. The portion 143 includes a recess 145, and the rod end has a recess 144. The plate 15 is provided with a central screw hole 69. The piston rod further comprises a longitudinal long hole 26 and central transverse long hole 27 for a purpose described below.

Figure 17:
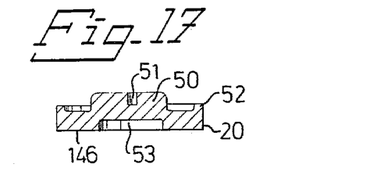
FIGS. 17-18 show a circular plane valve disc by way of a diametral section and, respectively, from above.
Figure 18:
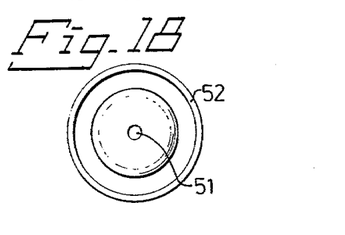

The plane slide disc or valve plate 20 shown in FIGS. 17 and 18 is a circular disc of nylon or another suitable material with a peripheral edge flange 52 and, as mentioned above, a central blind bore 51, a hub 50 and a circumferential surface 146. In FIG. 18 it is shown from above.

Figures 20, 21:
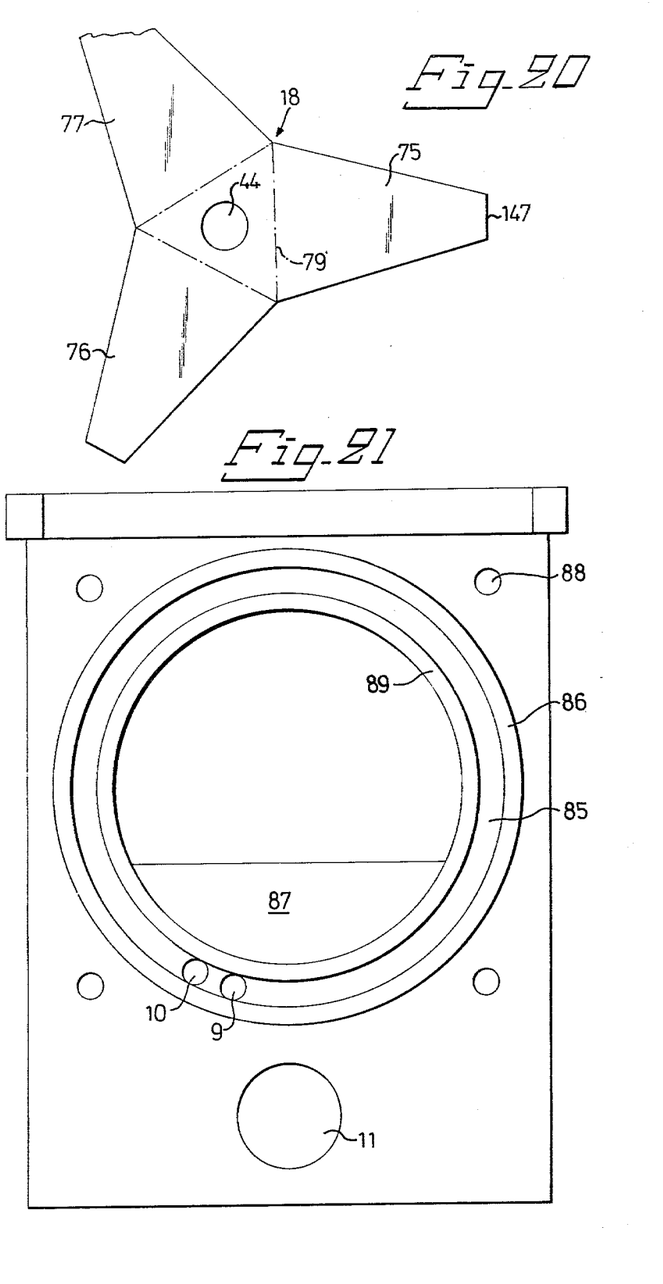
FIG. 20 shows a valve disc compression spring from above.
FIG. 21 shows the meter housing from the side.

The valve spring 18 shown from above in FIG. 20 comprises three legs 75-77 folded downward along folding lines 79 and is provided with a central hole 44. The ends 147 of the legs are intended to rest against the inner wall of the flange 52 (FIG. 17) of the valve plate 20 in order to press the plate into sealing engagement with the sealing surface 134 (FIG. 1). The spring is made of a suitable spring material.

FIG. 21 is a lateral view of the housing from the inlet end. The wall includes screw holes 88 for attaching the cylinder head 1. The Figure further shows the inlet 11 and the aforementioned bores 9 and 10. 87 designates a side wall of the housing bottom 133. A circular shoulder 86 extends about the cylinder bore, and inside said shoulder extends a circular groove 85 and inside thereof a defining edge 89.

Figure 22:
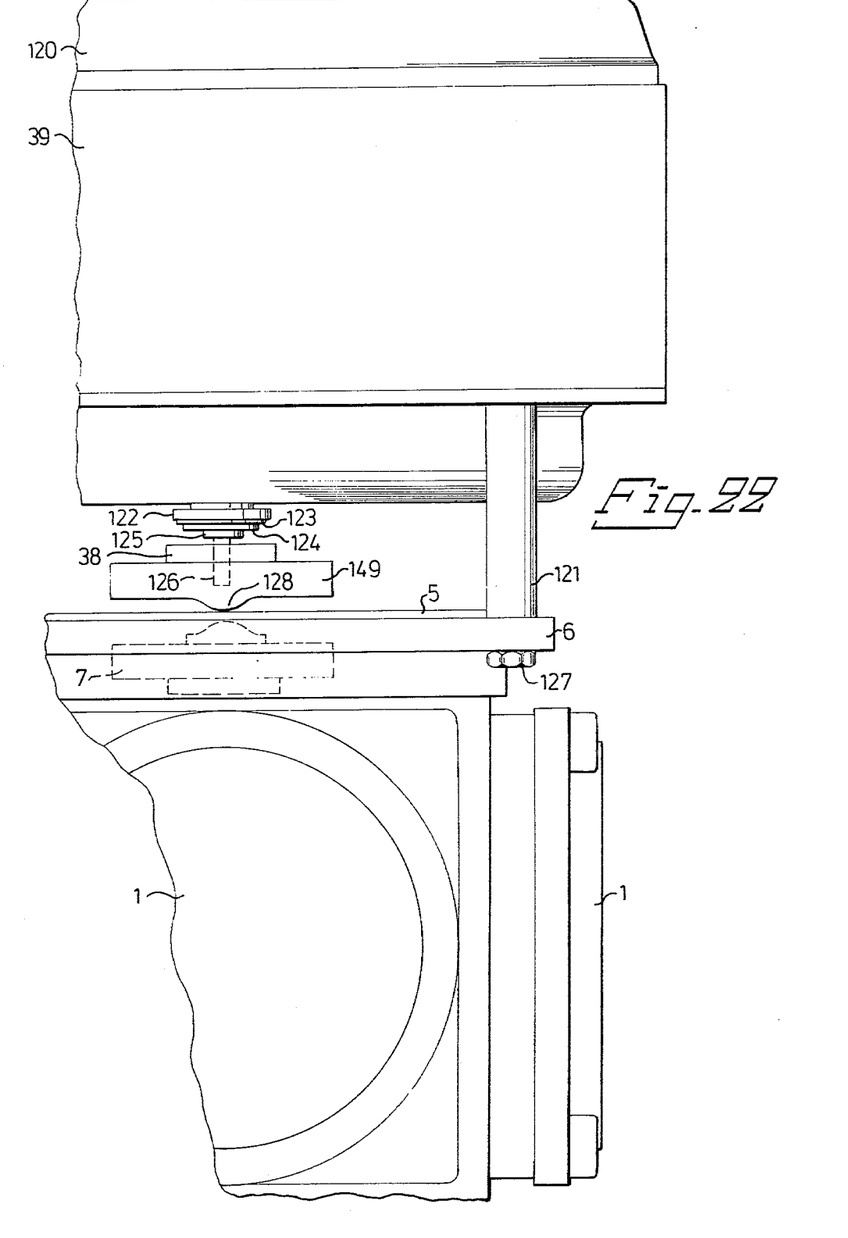
FIG. 22 is a partial view of the meter housing coupled together with a card-printing unit according to Swedish Patent No. 336 920 and U.S. Pat. No. 3,846,803.

FIG. 22 is a partial view of a card printing device, for example according to the patent specifications 336 920 and 354 370, mounted on the flow portion of the fuel volume meter according to the invention. The printing mechanism is designated by 39, and a rotatable cover thereof is designated by 120. The printing mechanism is attached to the cover 6 by means of columns 121 with a nut 127 screwn onto the column end. The housing is shown partially with cylinder heads 1 mounted thereon and with its sealing disc 5 and its magnetic coupling 7.

Located centrally on the bottom of the printing mechanism is an input shaft, which comprises an end square pin 126 and a stationary collar 125. A bearing disc 122 is attached to the bottom of the printing mechanism. On the input shaft a loose disc 123 is provided which is held by a U-shaped spring catch 124. A magnet holder 38 similar to the holder 19 is attached to the shaft end 126, which is inserted into a square hole in the portion 38, which rests with a protrusion 128 on the disc 5. As can be seen, in order to avoid sealing of the rotating output shaft from the flow portion, this rotary movement is transferred in a magnetic way, i.e. the movement of the unit 7 is transferred magnetically through the disc 5 (which, of course, is of a non-ferromagnetic material) to the magnetic ring 149 of the input shaft to the mechanism 39.

Figure 33:
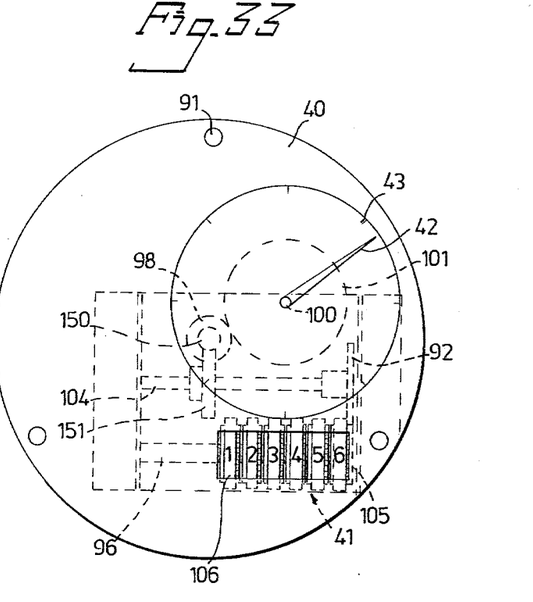
FIGS. 33-34 show an indicating unit to be coupled to the housing of the meter flow portion to replace the card-printing unit according to FIG. 22.
Figure 34:
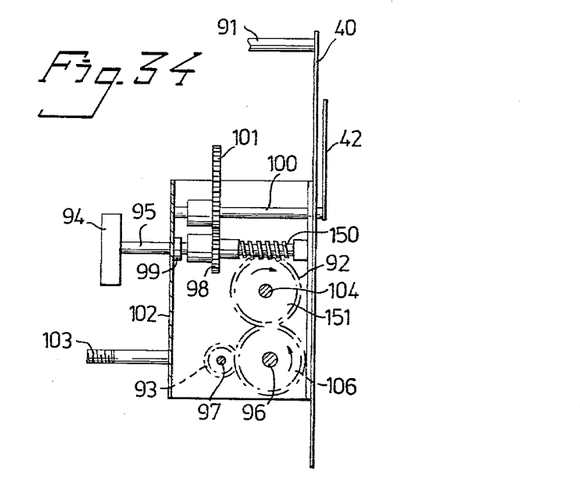

In FIGS. 33 and 34 a variant is shown, comprising an indicating volume counter to be connected to the flow portion of the meter according to the invention.

As shown in FIG. 33, the counter or indicating unit 40 seen from above comprises a scale 43 with a pointer 42 and counting mechanism 41. At the lateral view according to FIG. 34 the unit comprises holding columns 91 with a threaded end 103 for attachment analogous to the unit 39 shown in FIG. 22. The input shaft 95 is provided with a magnetic disc 94 for co-operation with the magnetic coupling 7. The shaft 95 is supported in a bearing 99 in a hood 102 of the counting mechanism and provided with a gear wheel 98 meshing with a gear wheel 101 on a pointer shaft 100. Reference character 92 designates a driving gear wheel for the counting mechanism 41 meshing with a gear rim 105 on a first counting mechanism wheel 106. The counting mechanism wheels 106 are located on an axle 96. On an axle 97 decimal transfer wheels 93 are arranged to co-operate with gear rims on the respective counting mechanism wheel 106, except for the wheel located farthest to the right which meshes with the driving wheel 92 mounted on an axle 104. Axle 104 carries on its opposite end a corresponding gear wheel 151, which meshes with a screw worm 150 at the end of the shaft 95, so that the movement of the input shaft 95 is transferred to the counting mechanism 41.

Figures 8, 9, 10:
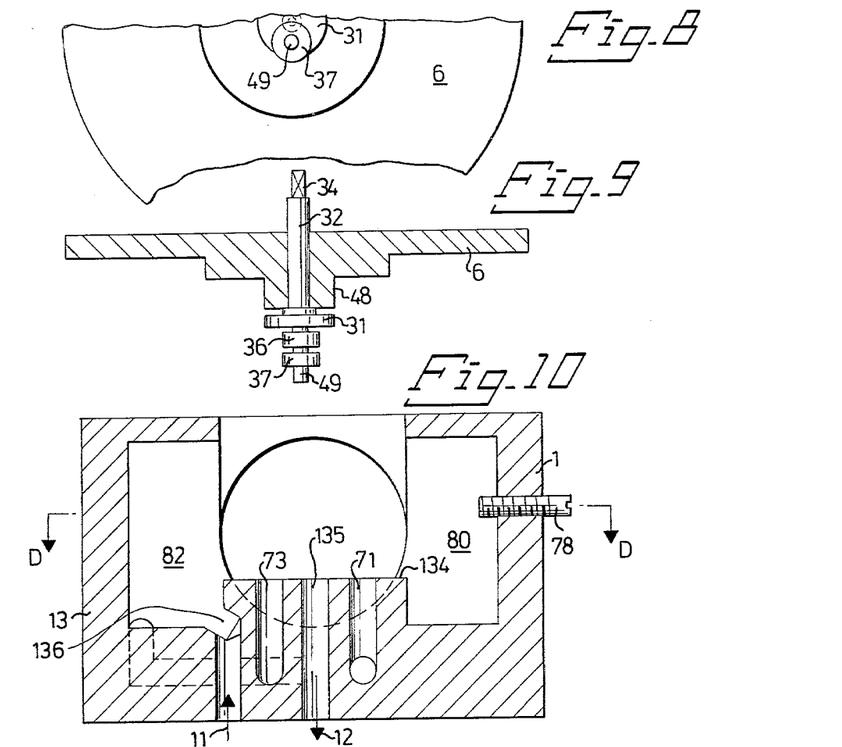
FIGS. 8-9 show another simplified meter housing cover from below and, respectively, by way of a diametral section.
FIGS. 10-11 are sections corresponding to FIG. 1 and, respectively, FIG. 2 of a simplified meter housing.
Figure 11:
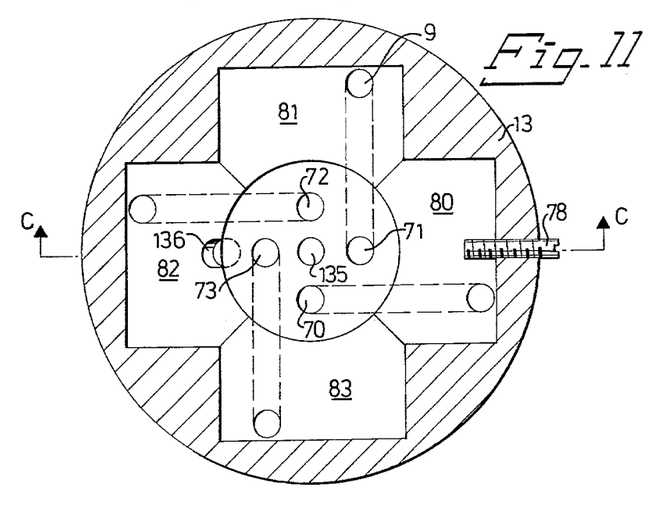
Figure 15:
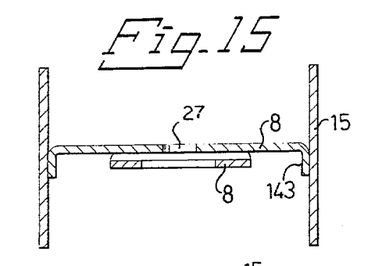
FIGS. 15-16 show a pair of intersecting simplified piston rods by way of a lateral section and, respectively, from above.
Figure 16:
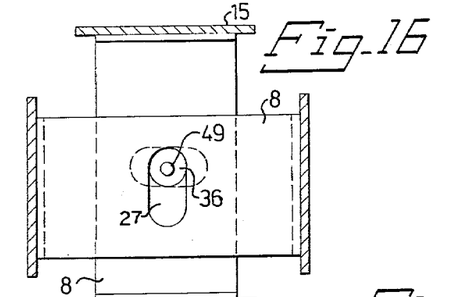
Figure 19:
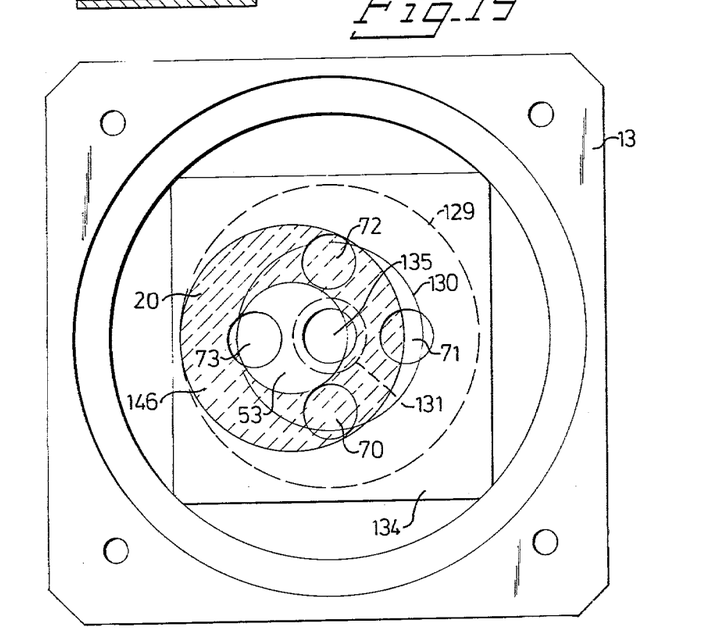
FIG. 19 shows the housing from above, with the sealing surface of the valve disc slantly dashed.

In FIGS. 8 and 9 a simplified design of the cover 6 is shown. Th cover 6 is sealingly attached upon the meter housing 13. The outgoing shaft (crankshaft 32) is mounted in cover 6 and provided, as previously, with two easily movable rollers 36,37. In FIGS. 10 and 11 the housing 13 is shown by way of a section C—C and, respectively, D—D in a simplified design adjusted to the cover 6 in FIGS. 8 and 9. In FIGS. 15 and 16 a pair of piston rods 8 for this embodiment are shown, and in FIGS. 17 and 18 a corresponding plane valve disc 20 is shown. FIG. 19 shows from above the housing 13 with the contact surface 146 of the disc 20, the valve surface 134 being shown slantly dashed, which two surfaces are accurately plane and smooth. The plate or slide disc 20 in FIG. 19 has a design adjusted to the embodiment shown in FIGS. 1–2.

The mode of operation of the plate or disc 20 in co-operation with the bores or holes in the valve surface 134 is as follows. The pin 49 (FIG. 3) is inserted into the hole 51 in the valve plate 20 (FIG. 17) and into the hole 44 (FIG. 1) in the valve spring 18. The plate 20 then is pressed by spring 18 against the valve surface 134. When the valve plate 20 with its contact surface 146 covers the holes 71 and 73 in FIGS. 10 and 11, the hole 72 over the recess 53 in the plate 20 is connected to the outlet hole 135. The inlet hole 136 is connected to the hole 70 via the inner chamber of the housing 13. When the crank disc 31 is turned through one quarter of a revolution in a counterclockwise direction (to the position in FIG. 19), the holes 70 and 72 are closed, and the outlet hole 135 is connected to the hole 73. The hole 71 is connected to the fuel inlet.

Continued rotation implies that at the rotation of one revolution of the disc 20 the inlet hole 136 is caused in due succession to communicate with the holes leading to the cylinder bores 80, 81, 82 and 83, while the outlet hole at the same time is connected to the cylinder bores or cylinder chambers 82, 83, 80 and, respectively, 81. The intermediate positions between the extreme positions of the disc 20, to the left, to the right, downwardly and upwardly, provide a gradual opening to the cylinder chamber next in turn to open fully. The same applies to the outlet side. The pistons in the cylinder bores will successively slide in pairs, because these pistons are oppositely connected in pairs by means of the intersecting piston rods 8, which are provided with a transverse groove 27 in their center, which grooves intersect each other (FIG. 16) to form an opening for the rollers 36, 37 (FIG. 3), which rotate freely on the crank 33 and, thus, are driven freely by the corresponding piston rod.

The pressure in the chamber 80 from the inlet 136 presses the piston pair in the chambers 80 and 82 to the left in FIGS. 10–11. The result is that the chamber 82 is emptied to the outlet 135. At the same time, the upper roller 36 on the crank 33 is actuated by a force directed to the left. The crank disc 31 with the crank 33 and the two rollers 36, 37 start to rotate counterclockwise. The valve plate 20 participates in the movement of the crank 33 and gradually opens the inlet to the chamber 81 and the chamber 83 to the outlet. The piston pair 81,83 then move downward and press with their piston rod 8 on the lower roller 37, so that the counterclockwise rotation in this way is maintained.

The load being taken out from the piston rods 8 is only of such a size as to overcome the friction of the plate 20 against the valve surface 134, and the load required for driving magnetically, for example a counting mechanism, with the outgoing shaft. Friction forces in the pistons and flow resistance in the different passageways are fully balanced by forces in the piston rods and the difference between inlet pressure and outlet pressure, without loading the crank disc 31 and its bearings.

In FIG. 19 reference character 129 designates the location of the outer periphery of the plate 20, reference character 130 designates the location of the inner periphery, and reference character 131 designates the location of the centre of the plate 20.

Figure 23:
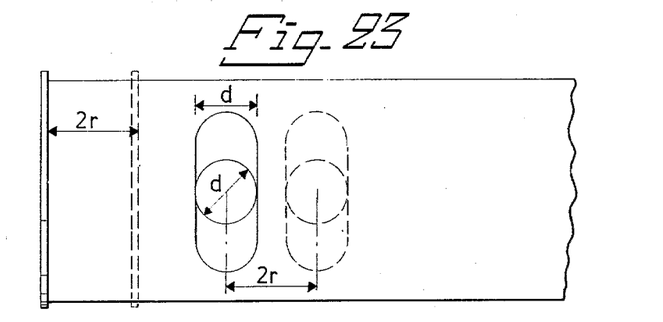
FIGS. 23-26 show piston rods to explain the adjustment of the meter.
Figure 24:
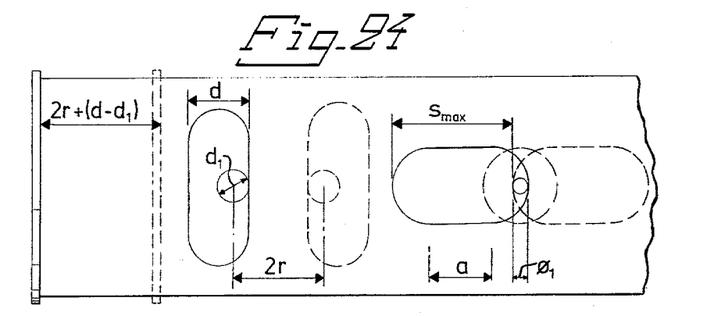
Figure 25:
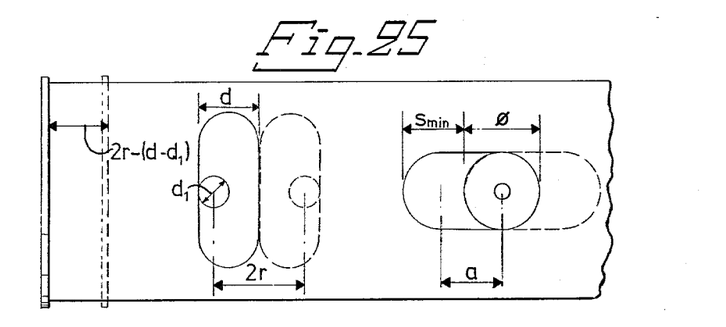
Figure 26:
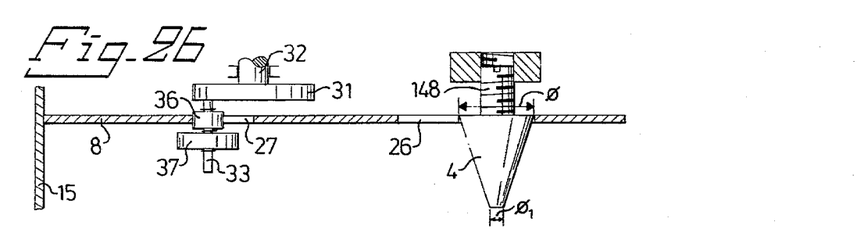

The adjustment or calibration of the meter is described with reference to FIGS. 23–26, of which FIG. 26 shows by way of a section a piston rod 8 with end clamping plate 15 for the rubber membrane, transverse long hole 27 and longitudinal long hole 26, the end of the crank mechanism with crank shaft 32, crank disc 31, crank 33 and rollers 36, 37 and an adjusting cone 4 with adjusting screw 148 inserted into the longitudinal hole 26. FIGS. 23–25 show the piston rod 8 seen from above.

When the rollers 36,37 fit well in the transverse holes of the piston rods, the liquid amount V flowing through per shaft revolution is as follows:

$$V = 4 \times 2 \times r \times (\pi D^2 / 4)$$

where 4 are the four pistons, 2r is the stroke length, which is equal to twice the crank radius r, and the last term is the piston area (D=piston diameter). Consequently, $$V = 2\pi r D^2$$

Logarithmation yields:

$$\ln V = \ln 2\pi + \ln r + 2 \times \ln D$$

Derivation yields $$\frac{dV}{V} = 0 + \frac{dr}{r} + \frac{2dD}{D}$$

It is apparent that a tolerance of 1% in the crank radius (for example r=4, dr=0.04, dr/r=1/100=1%) yields dV/V=1%, consequently a tolerance of measured volume=1%. A tolerance of 1% in the piston diameter (for example D=38, dD=0.38, dD/D=1/100=1%) yields dV/V=2%, consequently of measured volume=2%. At a tolerance error of 1% both for r and D, a faulty indication by 3% can be obtained. Instead of tighting up the tolerance requirements, it is preferred to adjust the volume per revolution to its rated value $V_B$. The meter, therefore, shall comprise calibration possibility.

Calibration is carried out as follows:
The stroke length for one piston pair is adjusted so as to deviate from 2r (see FIGS. 23-24).

In FIG. 23 the diameter of the roller and the width of transverse hole both are equal to d. The stroke length is 2r.

In FIG. 24 the diameter of the roller has been reduced to $d_1$.

The piston rod then can increase its stroke length beyond previous 2r. The increase is equal to the clearance between the hole and the small roller. The maximum stroke length, thus, is $$= 2r + (d - d_1)$$

The piston rod also passes through this extra distance, driven by the pressure on the piston from the inlet. After a corresponding end position, the crank disc is driven in counterclockwise direction by the intersecting piston rod and its roller of "normal size". After the fully drawn angular position in the Figure has been passed, the valve disc 20 directs the inlet pressure to the cylinder 82, and the piston rod moves to the right and actuates the small roller first after the clearance $d - d_1$ has been consumed. The diametral end position is drawn in a dashed manner in FIG. 24.

In FIG. 25 the stroke length instead has been reduced by the clearance, which yields the minimum stroke length $$= 2r - (d - d_1)$$

The plane valve disc 20 and the intersecting piston rod in this case as well as in the foregoing case manage the passage over the end position drawn in fully line in the Figure.

The adjusting cone 4, which can be screwn up and down, runs in the longitudinal slit 26 in one of the two intersecting piston rods and controls the stroke length. When the cone is screwn up (FIG. 24), the slit end contacts the narrow end $\phi_1$ of the cone. The maximum stroke length is $$S_{max} = a + \phi - \phi_1$$

When the cone 4 is screwed downward (FIGS. 25-26), the end of the longitudinal slit contacts the large end $\phi$ of the cone. The minimum stroke length is $$S_{min} = a$$

Adjustment, thus, is to be made so that $$S_{max} a + \phi - \phi_1 = 2r + (d - d_1)$$

and $$S_{min} = a = 2r - (d - d_1)$$

When the height of the cone (cone angle) is adjusted to the pitch of the thread, and when stroke lengths and diameters are taken into consideration, it is possible, for example, that the rotation of the cone through one revolution corresponds to a change in volume by 1% per revolution.

The corresponding calibration of the meter then is extremely simple. It is started with the cone in central position, and with passing an accurately measured volume through the meter. When a coupled instrument shows more than the measured volume, for example 1.5% too much, the adjusting cone must be screwn up one and a half revolution. The volume per revolution shall increase by 1.5% for obtaining agreement between indicated volume and real volume. There is, certainly, a non-linearity about the revolution, but every entire revolution yet corresponds to a definite volume.

Alternatively to the adjusting cone 4, an adjusting screw 78 in the cylinder head 1 could instead be used, which screw acts on the clamping disc 16 for limiting the stroke length (FIG. 11).

Figure 31:
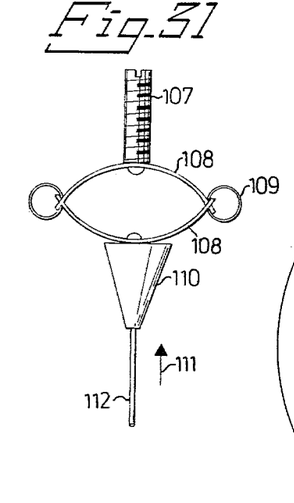
FIGS. 31-32 illustrate the automatic temperature compensation of the meter.
Figure 32:
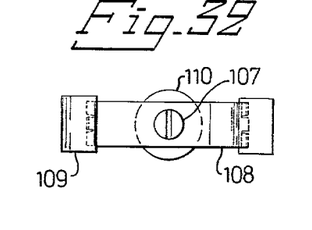

In FIGS. 31 and 32 a means for automatic temperature compensation at a meter according to the invention is shown by way of a lateral view and, respectively, from above.

An adjusting cone 110 of a type similar to the adjusting cone 4 in FIG. 3 and provided, for example, to engage with a longitudinal long hole 26 in a piston rod 8 has an end 112 and is attached at the upper end to a bimetal spring 108 comprised in a pair of such springs, which are held together at the ends by lock springs 109. The upper bimetal spring, and therewith the cone 110, can be adjusted by an adjusting screw 107. The bimetal springs 108 bathe in the fuel in the meter. The arrow 111 shows the movement of the cone 110 at increasing temperature.

Fuel expands in heat by about 1.1% per 10° C. When the fuel tank is filled with fuel of the temperature +10° C. from an earth tank and the fuel is consumed at +30° C., the fuel meter will show that the volume consumed exceeds the tanked volume by (30-10)×1.1=2.2%. Therefore, a temperature compensator, for example according to FIGS. 31-32, preferably is provided in order to obtain full agreement between tanked volume at one temperature and consumed volume at another temperature. The weight of the fuel at tanking and consuming is in both cases the same, and the fuel meter, thus, can be said to be "weight adjusted".

Different ways of coupling in the fuel meter into fuel feed systems are dealt with in connection with FIGS. 27-30.

Figure 27:
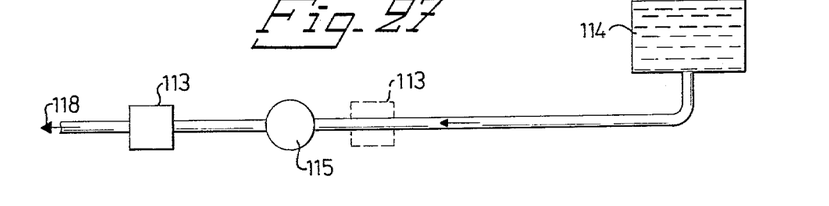
FIGS. 27, 29 and 30 show different ways of coupling the meter into the engine fuel feed system.

FIG. 27 shows a fuel meter 113 coupled into the fuel feed system for a petrol car engine. The meter is coupled into the fuel line between the fuel pump 115 and the carburettor (arrow 118), alternatively before the pump 115 (shown by dashed lines). The fuel tank is designated by 114.

Figure 28:
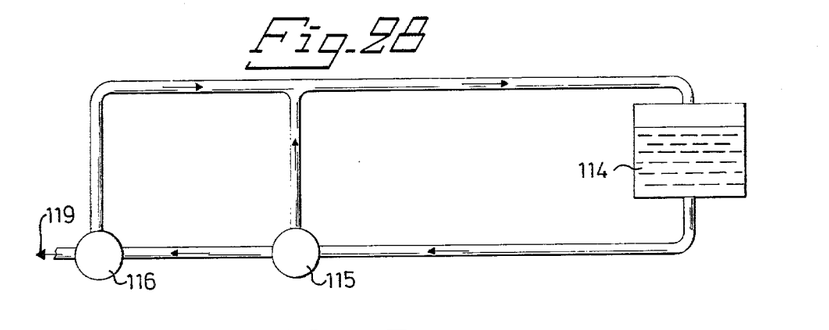
FIG. 28 shows a known fuel feed system for a diesel engine.

In FIG. 28 a normally coupled fuel feed system for a diesel engine is shown without the fuel meter according to the invention. The flow of the fuel is indicated by arrows in the conduits. The arrow 119 designates the discharge direction to the engine, and 116 is the injection pump.

At diesel engines for motor-cars the coupling of the fuel meter is not as simple as at a petrol engine according to FIG. 27. A diesel engine comprises two pumps, i.e. one feed pump 115 and one injection pump 116. The injection pump is controlled by the engine load and number of revolutions. The fuel not used for injection usually is returned to the fuel tank. The feed pump has excess capacity, and the fuel not being taken up by the injection pump also is returned to the tank. Fuel, which was subjected to pressure in the pumps, has an increased temperature. This fuel preferably is cooled by returning it to the tank exposed to slip stream.

Figure 29:
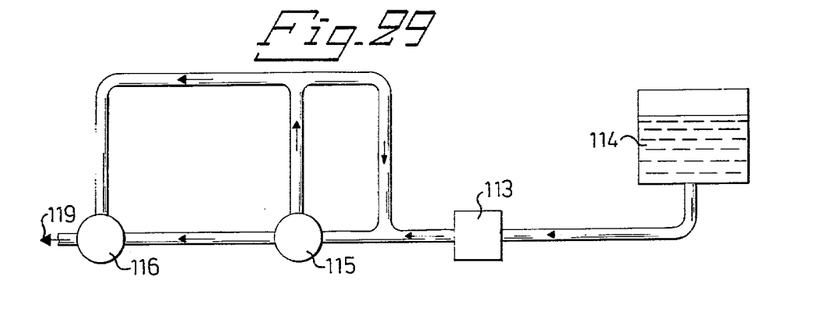

FIG. 29 shows the most simple coupling of a fuel meter according to the invention at a diesel engine. In this case, however, the return fuel is not cooled, which should be desirable, because a diesel engine seems to lose efficiency when being operated with heated fuel.

Figure 30:
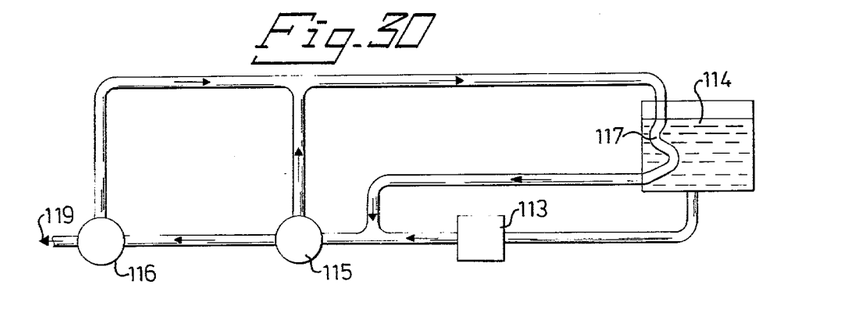

In FIG. 30 another way of coupling is shown, at which the return fuel flows through a cooling coil 117 in the tank 114 and is delivered in cold state to a T-pipe after the fuel meter. The meter 113 in this case is loaded by a warmer fuel, which should be advantageous, because in cold diesel fuel there is risk of precipitation of heavy oil fractions, which can stop the fuel flow. The cooling coil 117 can be replaced by a separate cooling tank where air bubbles in the return fuel can be separated.

Among the advantages of the fuel volume meter according to the invention can be mentioned its simplicity in design, its easy adjusting by means of a screwdriver, its rotary output movement, which is coupled magnetically to a counting mechanism in a printing and/or indicating unit, the possibility of measuring very small fuel flows, the feature that the mechanic output does not extend through the housing, so that no rotary member requires sealing, the reliable sealing of the housing in general against fuel leakage, large possible tolerances at the manufacture of structural details of the meter, its temperature compensation, its applicability to different types of fuels, the possibility of combining the meter with devices indicating and recording the distance as well as fuel mileage indicators, etc., driven by the vehicle in question.

I claim:

1. In a liquid volume meter having a housing (13) through which a volume of liquid to be measured passes, the housing formed with an inner chamber including an inlet (11) and an outlet (12) and having a drive means for driving a recording means in response to the liquid flow through the housing, said drive means comprising:

(a) first reciprocating means comprising a first pair of opposing pistons connected by a first rod located within a first bore in the housing;

(b) second reciprocating means comprising a second pair of opposing pistons connected by a second rod located within a second bore in the housing;

(c) rotary valve means for successively connecting the inlet and outlet to the first and second bores, the liquid flow through said housing as controlled by said valve means imparting a reciprocating motion to said first and second reciprocating means;

(d) transformation means connected to said first and second reciprocating means for converting the reciprocating motion into a rotary motion for driving the recording means;

(e) stroke adjusting means for adjusting a stroke of the reciprocating motion by limiting the stroke of one of the reciprocating means by limiting the stroke of the first rod wherein the first and second rods are connected to the transformation means and the stroke of the second rod is unaffected by said stroke adjusting means and said first rod has an opening therein, the adjusting means including a conical member supported by the housing and projecting into said opening and means for adjusting the depth of the conical member projecting into said opening whereby the stroke of said first rod is adjustable depending upon the penetration of the conical member into said opening.

2. The drive means of claim 1 wherein said first rod is perpendicular to said second rod.

3. The drive means of claim 2 wherein said first rod has a first central transverse elongated opening therein and said second rod has a second central transverse elongated opening (26) therein juxtapositioned over the first opening and wherein a crank is located within said first and second openings and is connected to said valve means.

4. The drive means of claim 3 wherein said first pair of opposing pistons is a first left piston forming a first left chamber (80) within the first bore of an opposing first right piston forming an opposing first right chamber (82) within the first bore; and said second pair of opposing pistons is a second left piston forming a second left chamber (81) within the second bore and an opposing second right piston forming an opposing second right chamber (83) within the second bore; and wherein said valve means successively exclusively connects the inlet selectively to a given one of said chambers and, in a corresponding manner, said valve means successively exclusively connects the outlet to the opposing chamber of said given chamber.

5. The drive means of claim 4 wherein said housing defines an inner chamber connected (136) to the inlet and having a plane valve surface (134) having a central hole (135) communicating with the outlet; further including four second holes (70-73) equidistantly arranged about said central hole, each said second hole communicating with one of said chambers (80-83), respectively; a circular plate valve (20) connected to said crank (33) and disposed over the plane valve surface providing rotational movement in response to said reciprocating motion thereby selectively connecting the inlet and outlet to opposing chambers.

6. The drive means of claim 5 wherein said circular plate valve (20) is a disc having a lower circular recess (53) on the side of the disc contacting the plane valve surface, said recess (53) having a diameter substantially equal to the sum of the distance between central hole (135) and a given one of said second holes (70-73) added to the diameter of said central hole added to the diameter of the given one of said second holes; and wherein the axis of rotation of said crank coincides with the central axis of the central hole (135) whereby liquid flow through the housing causes reciprocating motion of said pistons which in converted into rotary motion by said crank to drive the recording means.

7. The drive means of claim 3 wherein said crank is magnetically connected to the recording member.

8. The drive means of claim 3 wherein a compression spring (18) interconnects said valve means and said crank.

9. The drive means of claim 1 wherein said transformation means is magnetically connected to the recording member.

10. In a liquid volume meter having a housing through which a volume of liquid to be measured passes, the housing formed with an inner chamber including an inlet and an outlet and having a drive means for driving a recording means in response to the liquid volume flow through the housing, said drive means comprising:
(a) first reciprocating means located within a first bore in the housing;
(b) second reciprocating means located within a second bore in the housing;
(c) valve means for successively connecting the inlet and outlet to the first and second bores, the liquid flow through said housing as controlled by said valve means imparting a reciprocating motion to said first and second reciprocating means;
(d) transformation means connected to said first and second reciprocating means for converting the reciprocating motion into a rotary motion for driving the recording means, wherein said first reciprocating means is a first pair of opposing pistons connected by a first rod and said second reciprocating means is a second pair of opposing pistons connected by a second rod, said first and second rods connected to said transformation means, said first rod is perpendicular to said second rod, said first rod has a first central transverse elongated opening therein and said second rod has a second central transverse elongated opening therein juxtapositioned over the first opening and wherein a crank is located within said first and second openings and is connected to said valve means, said first pair of opposing pistons is a first left piston forming a first left chamber within the first bore of an opposing first right piston forming an opposing first right chamber within the first bore; and said second pair of opposing pistons is a second left piston forming a second left chamber within the second bore and an opposing second right piston forming an opposing second right chamber within the second bore; and wherein said valve means successively exclusively connects the inlet selectively to a given one of said chambers and, in a corresponding manner, said valve means successively exclusively connects the outlet to the opposing chamber of said given chamber, said housing defines an inner chamber connected to the inlet and having a plane valve surface having a central hole communicating with the outlet; further including four second holes equidistantly arranged about said central hole, each said second hole comunicating with one of said chambers, respectively; a circular plate valve connected to said crank and disposed over the plane valve surface providing rotational movement in response to said reciprocating motion thereby selectively connecting the inlet and outlet to opposing chambers, said circular plate valve is a disc having a lower circular recess on the side of the disc contacting the plane valve surface, said recess having a diameter substantially equal to the sum of the distance between central hole and a given one of said second holes added to the diameter of said central hole added to the diameter of the given one of said second holes; and wherein the axis of rotation of said crank coincides with the central axis of the central hole whereby liquid flow through the housing causes reciprocating motion of said pistons which is converted into rotary motion by said crank to drive the recording means, said first rod has an opening therein, and further including a calibration means having a conical member supported by the housing and projecting into said opening and means for adjusting the depth of the conical member projecting into said opening whereby the stroke of said first reciprocating means and, consequently, said drive means is adjustable depending upon the penetration of the conical member into said opening, and said means for adjusting is comprised of a temperature compensating means for adjusting the penetration of the conical member in response to the temperature of the liquid within the housing.

11. The drive means of claim 10 wherein said temperature compensating means is located within the inner chamber in direct contact with the liquid and includes a bimetal means (108, 109) which varies the penetration of the conical member as a function of the liquid temperature.

12. The drive means of claim 11 wherein said bimetal means is comprised of two bows of bimetal (108) interconnecting the housing and the conical member.

* * * * *